US012570130B2

(12) United States Patent
Talbert et al.

(10) Patent No.: US 12,570,130 B2
(45) Date of Patent: Mar. 10, 2026

(54) TONNEAU COVER, BED RAIL, AND A TONNEAU COVER SYSTEM

(71) Applicant: Extang Corporation, Ann Arbor, MI (US)

(72) Inventors: Robert Paul Talbert, South Lyon, MI (US); Nolin Miller Livingston, Clinton, MI (US); David Brian Michaud, Fenton, MI (US)

(73) Assignee: Extang Corporation, Ann Arbor, MI (US)

( * ) Notice: Subject to any disclaimer, the term of this patent is extended or adjusted under 35 U.S.C. 154(b) by 477 days.

(21) Appl. No.: 18/141,492

(22) Filed: May 1, 2023

(65) Prior Publication Data

US 2023/0398847 A1 Dec. 14, 2023

Related U.S. Application Data

(60) Provisional application No. 63/350,563, filed on Jun. 9, 2022.

(51) Int. Cl.
| | |
|---|---|
| *B60J 7/14* | (2006.01) |
| *B60J 7/00* | (2006.01) |
| *B60J 7/19* | (2006.01) |

(52) U.S. Cl.
CPC ............ *B60J 7/141* (2013.01); *B60J 7/0084* (2013.01); *B60J 7/198* (2013.01)

(58) Field of Classification Search
CPC .......... B60J 7/141; B60J 7/198; B60J 7/0084
USPC .................................................. 296/100.09
See application file for complete search history.

(56) References Cited

U.S. PATENT DOCUMENTS

| | | | | | |
|---|---|---|---|---|---|
| 4,784,427 | A | * | 11/1988 | Burgess | B60J 7/068 |
| | | | | | 296/100.09 |
| 5,527,081 | A | * | 6/1996 | Rausch | B60J 7/0084 |
| | | | | | 296/124 |
| 5,857,729 | A | * | 1/1999 | Bogard | B60J 7/1621 |
| | | | | | 296/100.09 |
| 10,286,765 | B2 | * | 5/2019 | Williamson | B60P 7/00 |
| 10,328,778 | B2 | * | 6/2019 | Aubrey | B60J 7/141 |
| 10,800,234 | B2 | * | 10/2020 | Dylewski, II | B60J 7/198 |
| 12,269,328 | B2 | * | 4/2025 | Xu | B60J 7/104 |
| 12,330,487 | B2 | * | 6/2025 | Schmeichel | B60J 7/141 |

(Continued)

FOREIGN PATENT DOCUMENTS

| | | |
|---|---|---|
| CA | 2820743 A1 | 2/2014 |
| CA | 3014628 A1 | 3/2019 |

OTHER PUBLICATIONS

Canadian Examination Report dated Sep. 26, 2024, for Canadia Application 3,200,121.

*Primary Examiner* — Jason S Morrow

(57) ABSTRACT

A tonneau cover for at least partially covering a cargo area of a vehicle, the cargo area having a pair of opposing side walls, a front wall, and a tailgate, the tonneau cover including: a first panel configured to be arranged adjacent to the front wall; a second panel adjacent to the first panel and rearward of the first panel, the second panel configured to be folded relative to the first panel to move the tonneau cover between an open configuration and a closed configuration. The first panel comprises a first panel section and a second panel section, and the first panel section is arranged at an incline relative to the second panel section.

20 Claims, 10 Drawing Sheets

(56)          References Cited

U.S. PATENT DOCUMENTS

| | | | |
|---|---|---|---|
| 2008/0100088 A1* | 5/2008 | Calder ..................... | B60J 7/141 |
| | | | 296/100.09 |
| 2011/0017116 A1* | 1/2011 | Thompson .............. | B63B 19/26 |
| | | | 114/182 |
| 2015/0165960 A1* | 6/2015 | Yue .......................... | B60J 7/141 |
| | | | 296/100.09 |
| 2016/0288691 A1* | 10/2016 | Aubrey ..................... | B60P 7/02 |
| 2018/0086190 A1* | 3/2018 | Yue .......................... | B60J 10/30 |
| 2021/0016646 A1* | 1/2021 | Dylewski, II ............ | B60J 7/141 |
| 2021/0070156 A1* | 3/2021 | Facchinello ........... | B60J 7/0084 |
| 2022/0001729 A1* | 1/2022 | Facchinello .......... | B60J 7/0084 |
| 2023/0415553 A1* | 12/2023 | Dylewski .................. | F16B 2/02 |
| 2024/0318480 A1* | 9/2024 | Muirhead ................ | E05D 1/02 |
| 2025/0050717 A1* | 2/2025 | Zheng ..................... | B60J 7/141 |

* cited by examiner

TONNEAU COVER, BED RAIL, AND A TONNEAU COVER SYSTEM

CROSS REFERENCE TO RELATED APPLICATIONS

This application claims priority to U.S. 63/350,563 filed on Jun. 9, 2022, the entirety of which is hereby incorporated by reference herein for all purposes.

FIELD

These teachings relate to a cover for a vehicle cargo area and more particularly to a tonneau cover, a bed rail, and a tonneau cover system.

BACKGROUND

Some vehicles, like pick-up trucks, have an open-topped bed or cargo area that may be used for storing or transporting cargo. A cover, such as a tonneau cover, may be placed over the cargo area. The tonneau cover may be opened to provide access to the cargo and/or the inside of the cargo area and closed to conceal the cargo from view and/or to prevent fluid and/or debris from entering the cargo area.

Many times, the size and/or shape of the cargo area may vary between different vehicle styles or platforms. At times, a specific-sized and shaped tonneau covers is required to be designed and built for each vehicle style, which may lead to increased time, cost, and complexity. Accordingly, it may be desirable to have a tonneau cover that can be used with different vehicle styles.

It may also be desirable to provide an improved tonneau cover, bed rail, and/or tonneau cover system in view of currently available products.

SUMMARY

These teachings relate to cover or tonneau cover, a bed rail, and a tonneau cover system. The tonneau cover system may include the tonneau cover and the bed rail(s).

A tonneau cover for at least partially covering a cargo area of a vehicle is provided. The cargo area has a pair of opposing side walls, a front wall, and a tailgate. The tonneau cover includes a first panel configured to be arranged adjacent to the front wall; a second panel adjacent to the first panel and rearward of the first panel, the second panel configured to be folded relative to the first panel to move the tonneau cover between an open configuration and a closed configuration. The first panel comprises a first panel section and a second panel section, wherein the first panel section is arranged at an incline relative to the second panel section.

DETAILED DESCRIPTION

Figure 1:
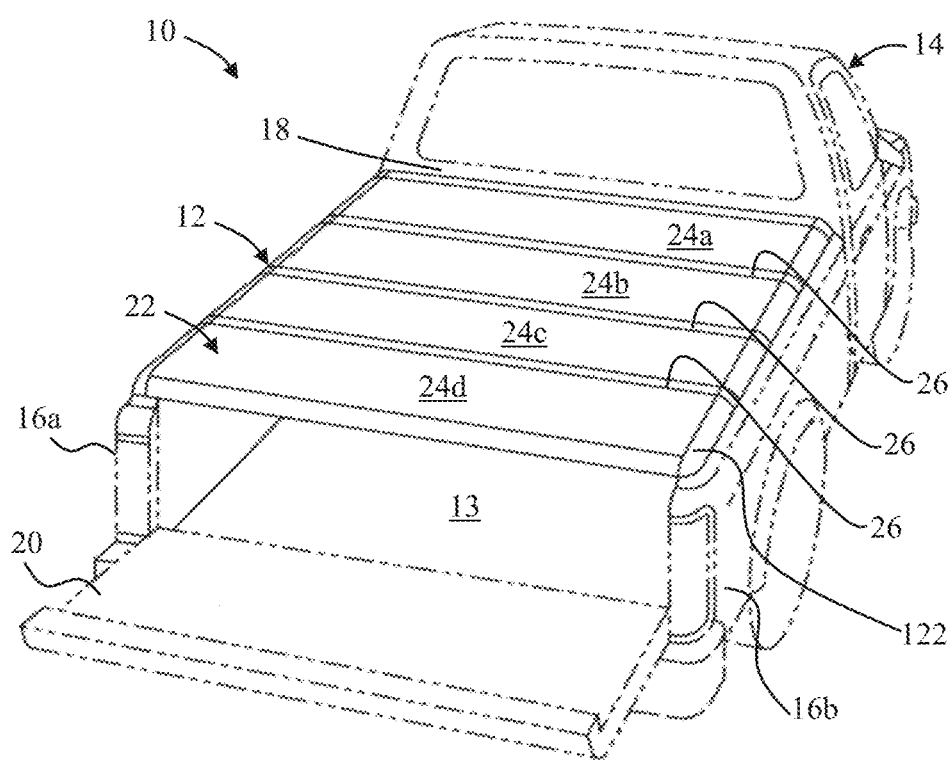
FIG. 1 is a perspective view of a vehicle and a tonneau cover covering the cargo area of the vehicle.

A vehicle 10 is illustrated in FIG. 1.

Figure 2:
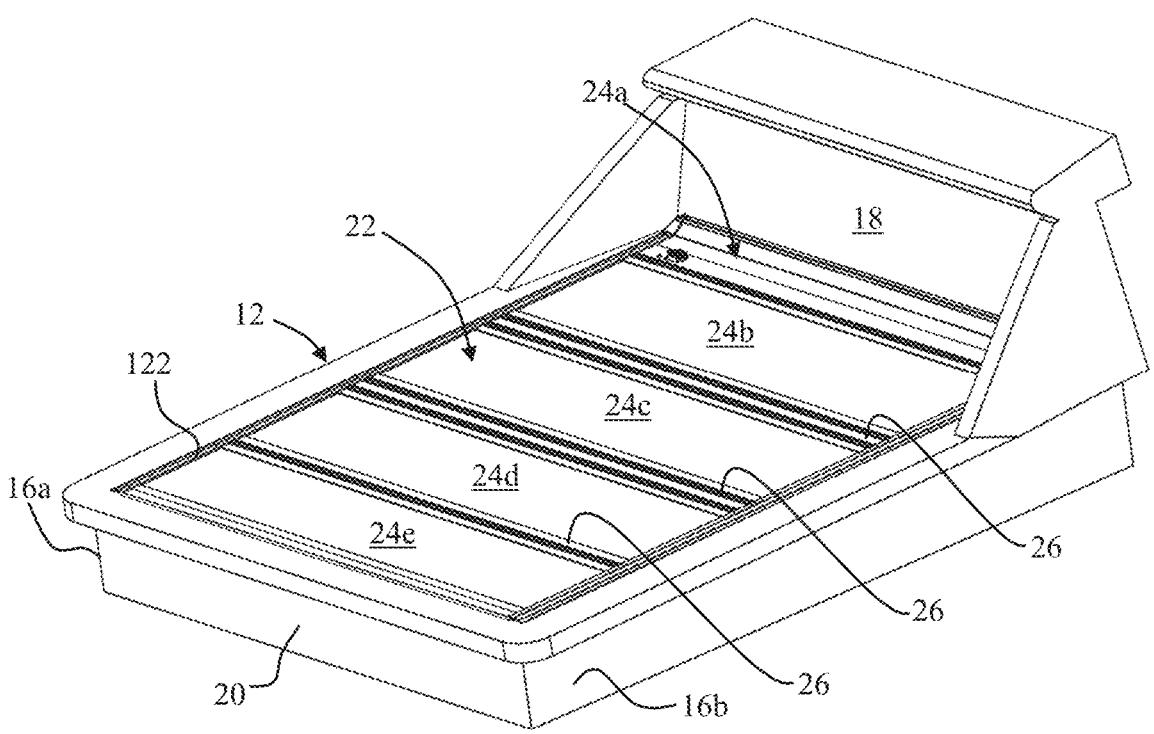
FIG. 2 is a perspective view of a tonneau cover covering the cargo area of a vehicle.

Referring to both FIGS. 1 and 2, the vehicle 10 comprises a bed or cargo area 12 and a passenger cab 14. The cargo area 12 is defined by a plurality of walls that include: opposing side walls or bed walls 16a, 16b, a front wall 18 located adjacent the passenger cab 14, and a rear wall or tailgate 20 that opposes the front wall 18.

The front wall 18 may be a shared or common wall with the cargo area 12 and the passenger cab 14. These vehicles may be one piece or uni-body vehicles. The front wall 18 may be a fixed gate or a mid-gate. The front wall 18 may provide access to the passenger cab 14 via a pass through or fold down wall or door. In some configurations, the front wall 18 may have an upper portion and a lower portion. The upper portion may be a glass or window and the lower part may be of a solid, non-glass or window construction. One or both of the upper portion and the lower portion may fold, roll, flip, or slide up or down, to provide access and/or a pass through between the cargo area 12 and the passenger cab 14. In some configurations, the upper portion and/or the lower portion may be removable or separable or detachable from the rest of the vehicle. In some vehicles, the front wall 18 may be a wall, segment, or portion of the vehicle that is separate from a rear wall of the passenger cab 14. The front wall 18 may be a fixed wall that is not moveable and/or does not provide any pass through or access between the passenger area and the cargo area.

The cargo area 12 has a bottom or floor 13 that is surrounded by the walls 16a, 16b, 18, 20. The bottom or floor 13 is opposite the top or open end of the cargo area 12.

A tonneau cover 22 (or cover 22 for short) may be placed over or on top of the cargo area 12. The tonneau cover 22 may include one or more panels 24. In FIG. 1, the tonneau cover 12 includes four panels 24a, 24b, 24c, and 24d. In FIG. 2, the cover 12 includes five panels 24a, 24b, 24c, 24d, and 24e. However, the tonneau cover 12 may include any number of panels, including as little as only one panel (i.e., no more than one panel), more than five panels (i.e., six panels or more), or more than one panel (i.e., two or more panels).

The tonneau cover 22 may include one or more hinges 26. A hinge 26 may connect adjacent panels together. A hinge may allow a panel to move relative to one or more adjacent panels, other panels, the cargo area 12, and/or the vehicle 10. A hinge may allow a panel to be folded or flipped onto an adjacent panel and/or under an adjacent panel.

The tonneau cover 22 and panels 24 (i.e., 24a-24e) in these figures is illustrated in the closed configuration. One or more of the panels 24 can be moved into the open position or an at least partially open position by moving or repositioning (e.g., folding, flipping, rolling, placing, moving, etc.) one or more panels 24 about the one or more hinges 26 of the tonneau cover 22.

Figures 3, 4:
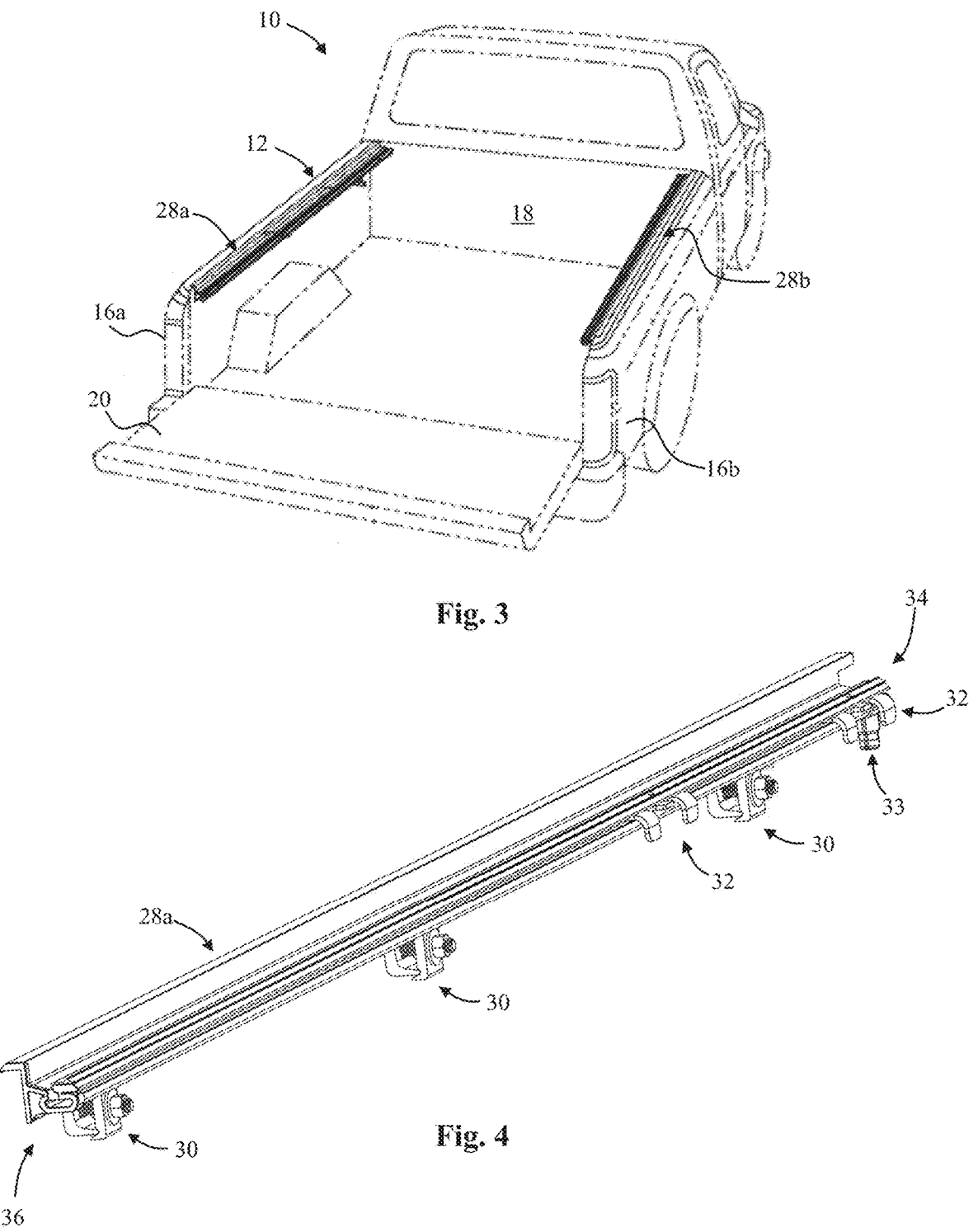
FIG. 3 is a perspective view of a vehicle and bed rails attached to the walls of the cargo area of the vehicle.
FIG. 4 is a perspective view of a bed rail.

For example, referring to Applicant's commonly-owned US Patent Application No. US20140152046A1 published on Jun. 5, 2014, the entire contents of which is expressly incorporated by reference herein for all purposes, an at least partially open position of the tonneau cover 22 may be gleaned from FIGS. 2A, and an open configuration may be gleaned from FIG. 3. FIG. 4 of US20140152046A1 may also illustrate an open configuration of the tonneau cover 22 according to these teachings. If the tonneau cover 22 according to these teachings is intended to be moved into the open configuration illustrated in FIG. 4 of US20140152046A1, where the tonneau cover 22 is folded against the wall or window 18, then the tonneau cover 22 according to these teachings may also include one or more features that function like the standoff system to support the tonneau cover 22, which are illustrated and described in FIGS. 9-14 of US20140152046A1 and which form part of this disclosure due to the incorporation of the entire teachings of US20140152046A1.

For purposes of orientation, panel 24a may be referred to as the first or front panel; panel 24b may be referred to as the second panel; panel 24c may be referred to as the third panel; panel 24d may be referred to as the fourth panel or rear panel (in a 4-panel system). In a five-panel tonneau cover, the panel 24e may be referred to as the fifth panel or rear panel.

Figure 13:
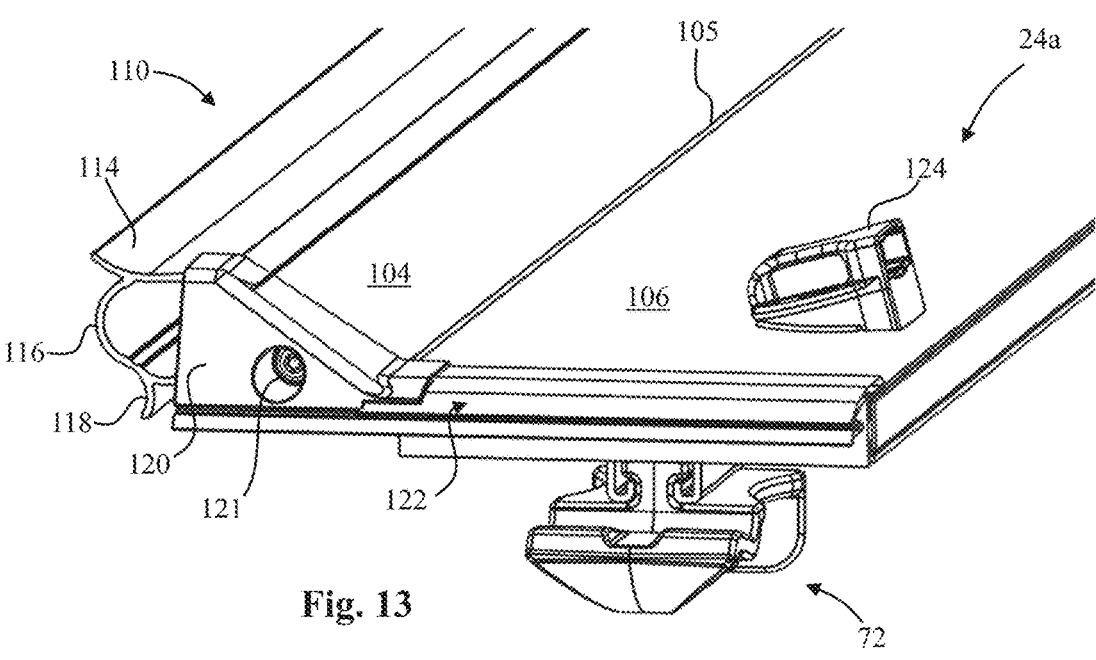
FIG. 13 is a partial perspective view of the first panel.
Figure 14:
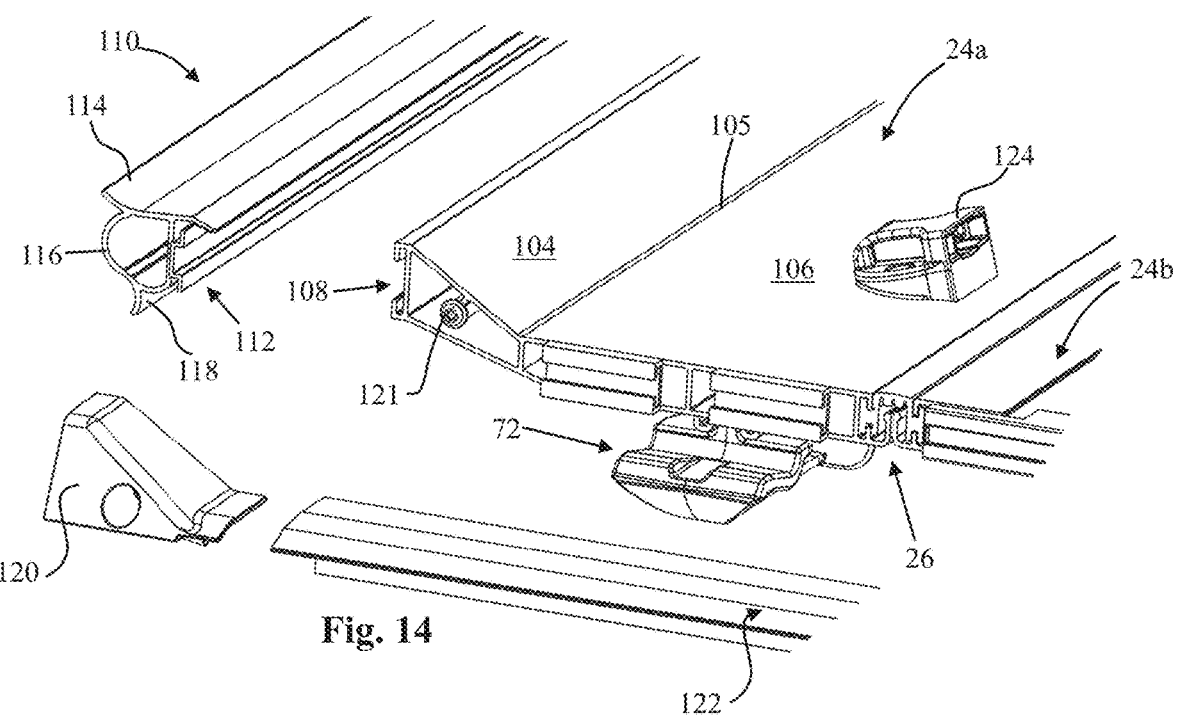
FIG. 14 is an exploded partial perspective view of the first panel.

The tonneau cover 22 may include a trim piece or molding 122 on one or both sides thereof. The molding 122 may function to close out any gaps between the lateral edges of the panels 24 and the walls 16a, 16b of the cargo area 12. The molding 122 may function to close out any gaps between the lateral edges of the panels 24 and the walls 16a, 16b of the cargo area 12 to restrict or prevent water and/or debris from entering the cargo area 12. The molding 122 may extend at least partially over the bed rails and/or the side walls defining the cargo area of the vehicle. The molding 122 is also illustrated in FIGS. 13, 14.

FIG. 3 shows the vehicle 10 without a tonneau cover installed or after the tonneau cover 22 has been removed or separated from the vehicle 10 or before the tonneau cover has been installed. A bed rail 28a, 28b is attached to each respective side wall 16a, 16b of the cargo area 12. One or both of the bed rails 28a, 28b may be attached to the inside wall of the respective side wall 16a, 16b facing the inside of the cargo area. Additionally, or alternatively, one or both of the bed rails 28a, 28b may be attached to the top surfaces of the respective side wall 16a, 16b. The top surface may be the surface of the side wall where one or more stake holes may be located. One or both of the bed rails 28a, 28b may be attached to the respective side wall 16a, 16b via one or more fasteners or clamps (clamps are discussed below at FIGS. 6 and 7). One or both of the bed rails 28a, 28b may extend entirely between the front and back walls 18, 20. One or both of the bed rails 28a, 28b may extend only partially between the front and back walls 18, 20.

A tonneau cover system may comprise the tonneau cover 22, one or both of the bed rails 28a, 28b, and/or one or more of the features and/or elements disclosed in this description.

FIG. 4 illustrates a bed rail 28a. The bed rail 28a may be attached to bed wall 16a, which may also be referred to as a driver-side bed wall. The other bed rail 28b illustrated in FIG. 3 may be the same as the bed rail 28a or may be a mirror image of the bed rail 28a. The description of bed rail 28a may also be applied to the bed rail 28b and therefore a specific description of bed rail 28b is not necessary. In other words, what is said about bed rail 28a applies to bed rail 28b and vice versa.

The bed rail 28a can be attached to the bed wall 16a with one or more fasteners or one or more clamps 30. In some configurations, the bed rail 28 may be attached or integrated with one or more bed caps, which may be components that are attached to a top end of the bed walls defining the cargo area of the vehicle (i.e., where the stake holes are located). The bed rail 28a may include one or more latch catches 32, illustrated and described in more detail with reference to FIGS. 8-12. The bed rail 28a may include one or more fluid and/or debris drains 33, for evacuating fluid and/or debris from a drain channel 44 illustrated and described in FIG. 5 below. A fluid and/or debris drain 33 is also illustrated and described at FIG. 21.

The bed rail 28a has a forward end 34, which is arranged closer to the wall 18 when installed in the vehicle. The bed rail 28a has a rearward end 36, which is closer to the rear wall or tailgate 20 when installed in the vehicle. While the drain 33 and the latch catches 32 appear to be located towards the forward end of the bed rail 28a, it is understood the drain 33 and/or latch catch 32 can be located at any location along the length of the bed rail 28a. It is also understood that there may be any number of latch catches 32, clamps 30, and/or drains 33.

Figures 5, 6, 7:
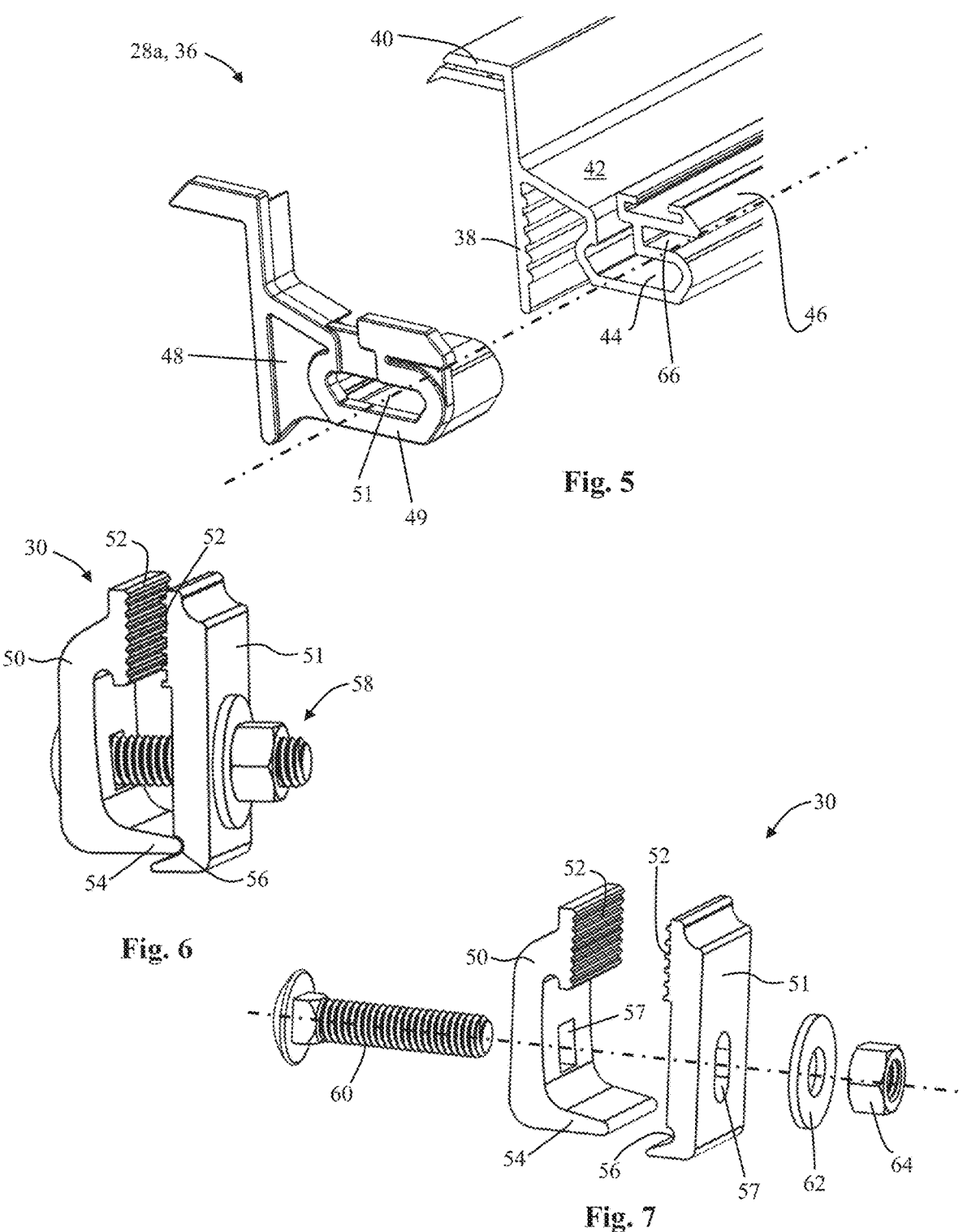
FIG. 5 is an exploded, close-up view of the end region of the bed rail.
FIG. 6 is a perspective view of the clamp.
FIG. 7 is an exploded view of the clamp.

FIG. 5 illustrates the rearward end 36 of the bed rail 28a. The bed rail 28a may be an extruded or molded member that includes a profile having a downwardly-extending mounting surface 38 and an outwardly extending mounting surface 40 projecting or extending from a top end of the downwardly-extending mounting surface 38. The bed rail 28a may have an inwardly extending surface 42 extending from a mid-region of the downwardly-extending mounting surface 38, a drain channel 44, and a cover supporting surface 46. The bed rail 28a may include a groove or channel 66 defined between the drain channel 44 and the cover supporting surface 46, which may function to receive the latch catch, described further below at FIGS. 8-9 and/or the latch described further below at FIGS. 19-20 A seal (not illustrated here, but described below and here) such as a bulb seal or other elastic, foam, or compressible member may be connected to or engage cover the supporting surface 46 and/or the track or channel defined on the cover support surface. One or more panels of the tonneau cover may come into contact and/or compress the seal when the tonneau cover is in a closed position. The compression of the seal may function to restrict or prevent water and/or debris from flowing around an edge of the one or more panels and into the cargo area. Alternatively, the seal may be provided on the bottom or B-side of the panels, and the seal may come into contact with the cover supporting surface 46 when the panel is brought into a closed position (i.e., horizontal position).

A rail end cap 48 may engage the rearward end 36 of the bed rail 28a. The rail end cap 48 may have a similar geometry to a cross-section profile of the bed rail 28a, The rail end cap 48 may function to close out the drain channel 44 to prevent water and/or debris in the drain channel 44 from draining or evacuating from the rearward end 36 of the bed rail 28a and potentially entering the cargo area. Water and/or debris may instead be directed through the drain channel 44 to the one or more fluid and/or debris drains 33 illustrated at FIGS. 4 and 21, which may be connected to a hose for evacuation to one or more preferred regions outside of the vehicle 10 and/or cargo area. The rail end cap 48 may also be a decorate component that functions to close out an unfinished or cut end of the extruded or molded profile. A similar rail end cap may be placed at the forward end 34 of the bed rail 28a (not illustrated).

The rail cap 48 may include an end wall 49. The end wall may be completely closed off to block any fluid and or debris collected in the drain channel 44 from exiting the end of the bedrail 28. However, in some configurations, the end wall 49 may include an opening 51 that may allow for fluid and or debris to be evacuated from the drain channel 44 through the opening defined in the end wall of the rail cap 48.

The clamp 30 is illustrated in FIGS. 6 and 7. The clamp 30 includes opposing fingers or jaws 50, 51. The fingers or jaws 50, 51 may include a textured or ribbed part 52 at an upper end thereof. Finger 50 includes a projection 54 and finger 51 includes a mating socket or catch 56 configured to receive the projection 54. Each finger 50, 51 has one or more bores 57, through which a fastener 58 can be passed. One or both of the bores can be smooth or threaded. The fastener 58 includes a bolt 60, washer 62, and nut 64.

To attach the bed rail 28a to the bed wall 16a, the textured or ribbed part 52 of finger 51 may be placed against a lower portion of the downwardly-extending mounting surface 38 of the bed rail 28a (FIG. 5), which may also have a textured or ribbed part. The finger 51 may be sized to fit within the U-shaped opening defined between the downwardly-extending mounting surface 38, the inwardly extending surface 42, and a wall of the drain channel 44.

The textured or ribbed part 52 of finger 50 may be placed against and behind a downwardly turned flange of the bed wall 16a (not illustrated). Therefore, the downwardly turned flange of the bed wall 16a and the downwardly-extending mounting surface 38 are generally parallel to one another and will be located between the two fingers 50, 51 of the clamp. The two fingers 50, 51 may then be brought together so that the projection 54 engages the catch 56 by tightening the fastener 58. The fastener 58 can be tightened (i.e., by tightening the nut 64) to bring the two fingers 50, 51 together and thereby clamp the bed rail 28a to the bed wall 16a. Thus, in an installed vehicle position, the downwardly-extending mounting surface 38 may be adjacent to a downwardly extending flange of the side wall 16a. In an installed vehicle position, the outwardly extending mounting surface 40 may be placed against a top surface of the side wall 16a (i.e., where any stake holes or pockets may be located).

Figure 8:
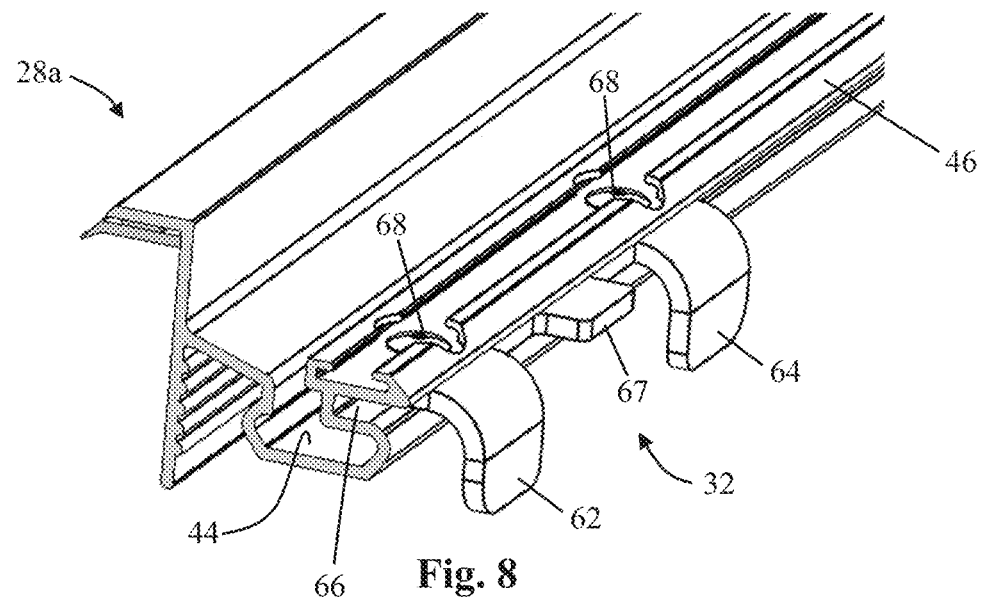
FIG. 8 is a perspective view of the latch catch and a portion of the bed rail.
Figure 9:
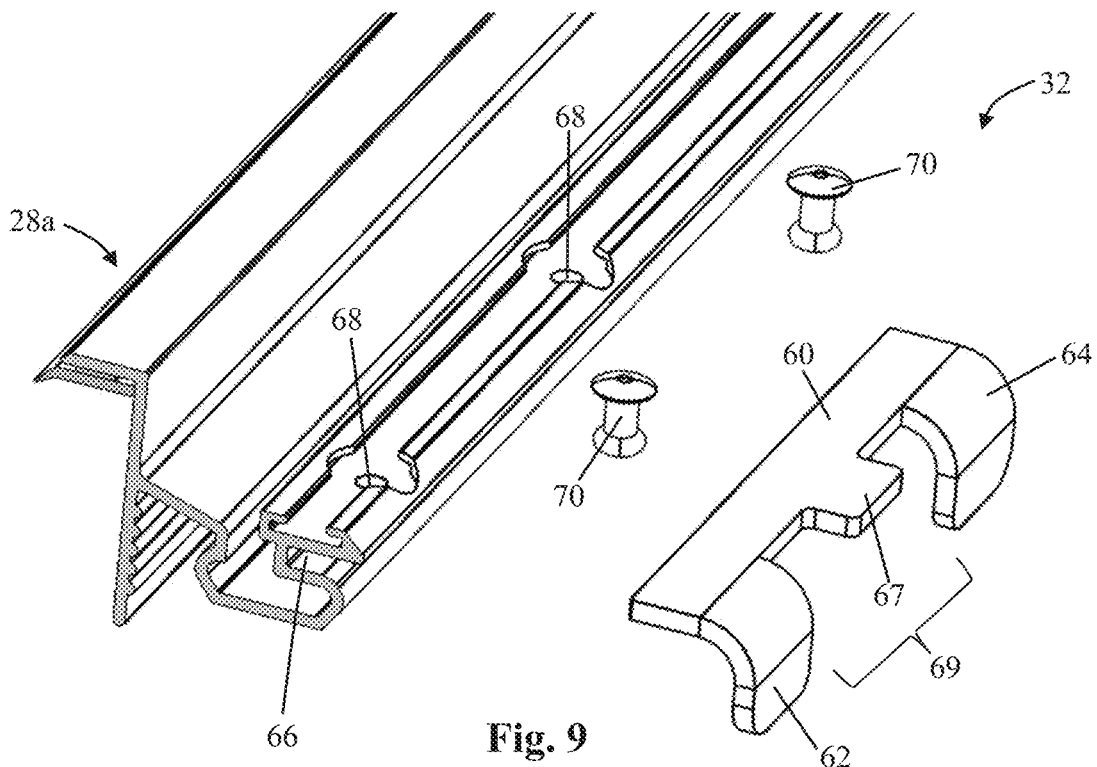
FIG. 9 is an exploded view of the latch catch and a portion of the bed rail.

FIGS. 8 and 9 illustrate a latch catch 32. There may be one or more latch catches 32 along a length of the bed rail 28a. For example, there may be one or more latch catches 32 adjacent to the first panel 24a, the second panel 24b, the third panel 24c, the fourth panel 24d, etc. The latch catch 32 comprises a base part 60, first member 62 extending from the base part a second member 64 extending from the base part 60, and a third member 67 extending from the base part 60 and between the first and second members 62, 64. The third member 66 may project in a generally horizontal direction relative to the base part 60. The first and second members 62, 64 may extend in a curved, downwardly, and perpendicular direction relative to the base part 60. A gap 69 may be defined between the first member 62 and the second member 64. By curving the first and second members 62, 64 in a downwardly direction, as opposed to the members 62, 64 extending like the third member 67 towards the center of the cargo area, the amount of encroachment into the cargo area is reduced. This advantageously prevents the members 62, 64 from potentially snagging a person or cargo when loaded or unloading from the cargo area.

The base part 60 of the latch catch 32 may be inserted into the channel 66 of the bed rail 28a, which is defined between the drain channel 44 and the supporting surface 46. The bed rail 28a may include one or more fastening bores 68. Fasteners 70 may be inserted into the fastening bores 68 and apply securing or holding pressure onto the base part 60, or other areas of the latch catch 32, to restrict or prevent movement or removal of the latch catch 32 from the channel 66 and/or to prevent axial movement of the latch catch 32 along a length of the channel 66. While two fasteners 70 are illustrated for securing the latch catch 32 to the rail 28, a single fastener 70 or more than two fasteners may be used. For example, a single fastener 70 may connect the latch catch 32 to the rail 28 and may be located in a generally central region of the base 60 (e.g., where the third member 67 is located).

Figures 10, 11, 12:
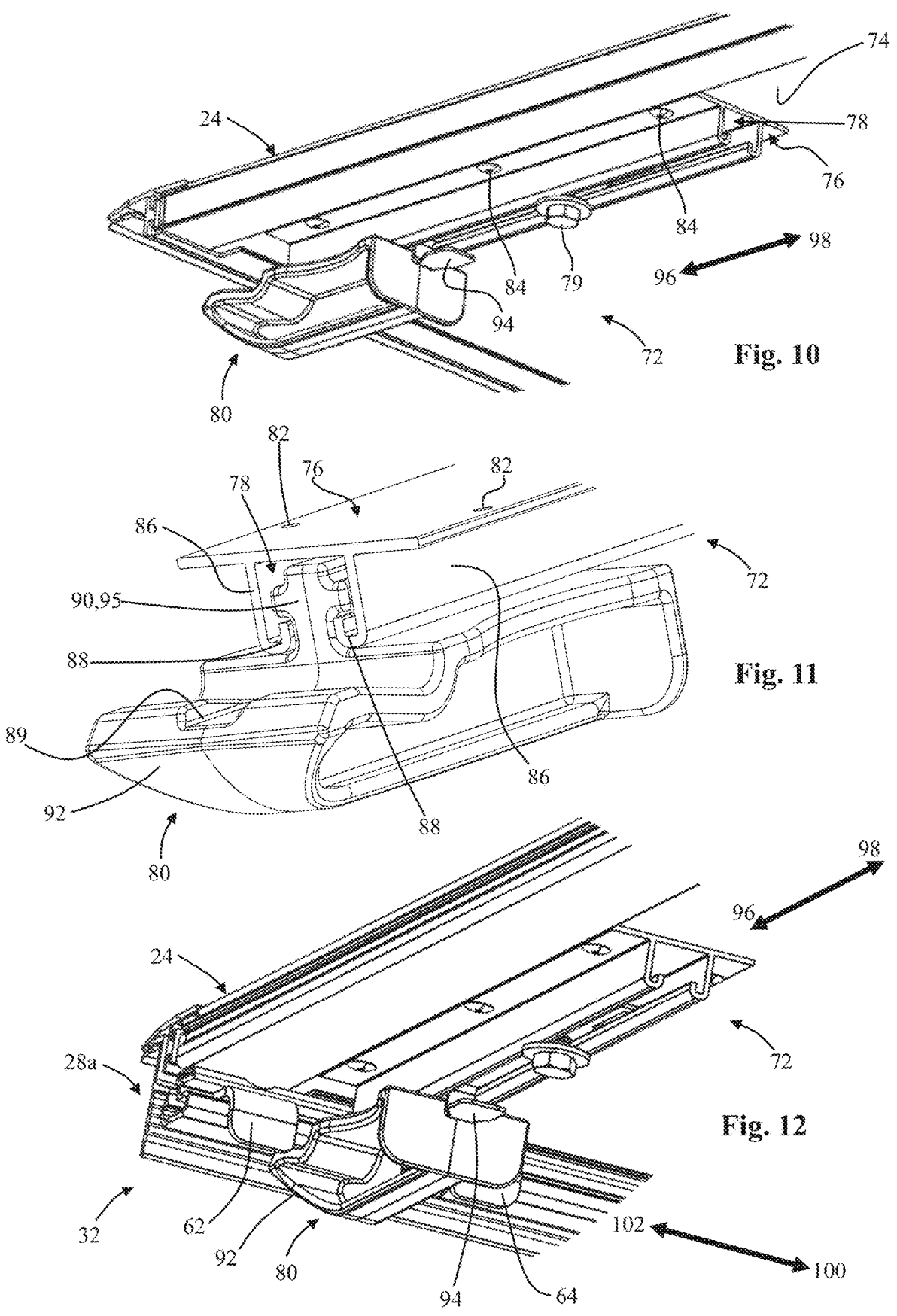
FIG. 10 is a perspective view of the latch.
FIG. 11 is another perspective view of the latch.
FIG. 12 is a perspective view of the latch engaging the latch catch.

FIGS. 10 and 11 illustrate a latch assembly 72. The latch assembly 72 may be attached to the bottom of B-side surface 74 of one or more of any of the panels 24. For example, one or more latch assemblies 72 may be attached to the bottom of the first panel 24a, the second panel 24b, the third panel 24c, the fourth panel 24d, the fifth panel 24e, etc.

The latch assembly 72 comprises a mounting plate 76, a guiding channel 78, and a latch 80.

The mounting plate 76 may be a planar sheet or plate that includes one or more bores 82 for receiving one or more fasteners 84 to attach the mounting plate 76 to the B-side surface 74 of one or more of any of the panels 24 (i.e., any of panels 24a-24e).

The guiding channel 78 may be attached to the mounting plate 76. In some configurations, the mounting plate 76 may be omitted and the guiding channel 78 can be attached (directly or indirectly) to the B-side surface 74 of one or more of any of the panels 24 (i.e., any of panels 24a-24e) via one or more fasteners. The guiding channel 78 may extend in a cross-car direction 96, 98, at least partially or entirely between the lateral edges of the panels. The guiding channel 78 may be comprised of a pair of downwardly extending arms 86, each having inwardly turned portions 88. Other cross-sectional shapes of the guiding channel 78 are envisioned, such as an I-shape, T-shape, U-shape, star-shape, etc.

The latch 80 comprises guide part 90 that is received into the guiding channel 78. The guide part 90 has a T-shaped cross section. However, the cross section of the guide part may be such that it complements whatever the cross-section of the guiding channel 88. The latch 80 may be contained in the guiding channel 78 via fastener 79. The latch 80 can be moved or slid along a length of the guiding channel 78 (i.e., in a cross-car direction when installed on the vehicle).

The latch 80 comprises a latching part 92. The latching part 92 projects laterally beyond an end face 95 of the guide part 90. The latching part 92 may have a width that is the same as or slightly smaller than the gap 69 defined between the members 62, 64 of the base of the latch catch 32 (See FIG. 9).

The latch 80 comprises an unlatching tab 94. Engaging the unlatching tab 94, for example, by depressing the tab 94 upwardly in a direction of the B-side surface 74 of the panel 24 (or downwardly in a direction away from the B-side surface 74 of the panel 24), allows the latch 80 to move or slide within the channel 78 so that the latching part 92 can engage and disengage the one or more latches 32 respectively. This allows the corresponding panel to be quicky and easily locked and unlocked relative to the bed rail 28a. This also allows a tonneau cover to be quickly and easily removed from the cargo area if desired.

For example, with additional reference to FIG. 12, when the latching part 92 is moved in the cross-car direction 96 towards the latch 32 on the bed rail 28a, the latching part 92 may be captured between the two members 62, 64 of the latch 32. This may thus lock the latching part 92 (and therefore the latch assembly 72 and the panel 24 connected to it) between the members 62, 64 and restrict or prevent movement of the panel 24 in a fore-aft direction 100, 102, which may be generally perpendicular to the cross-car direction 96, 98 that the guiding channel 78 extends along and/or the direction that the latching part 92 moves to engage and/or disengage the latch 32.

Referring back to FIGS. 8 and 9, the third member 67 may contact the end face 95 of the guide part 90 to restrict or prevent any further movement of the latching part 92 in the cross-car direction 96. The latching part 92 also includes a depression 89. The depression 89 may receive and/or engage the third member 67 of the latch 32, which may restrict or prevent movement of the panel 24 in an up and down direction.

FIGS. 13 and 14 illustrate the first panel 24a. The first panel 24a may be the panel 24a of the tonneau cover 22 that is arranged closest to the front wall 18 of the vehicle. FIGS. 13 and 14 also illustrate the latch assembly 72, which was illustrated and described above, attached to the B-side of panel 24a. FIG. 14 also illustrates an exemplary hinge 26 between panel 24a and 24b. It is understood that the description of panel 24a may apply to any of the other panels of the tonneau cover.

The first panel 24a comprises a first panel section 104 and a second panel section 106. The first panel section 104 is arranged closer to the front wall 18 than the second panel section 106. The first panel section 104 may be arranged at an incline or angle relative to the second panel section 106. For example, referring briefly to FIG. 15A, the A-surface of the first panel section 104 may be arranged at an angle "a" relative to the A-surface of the second panel section 106. The angle may be about 5 degrees or more, about 90 degrees or more, 100 degrees or more, 120 degrees or more, 130 degrees or more, 140 degrees or more, 150 degrees or more, 160 degrees or more, 170 degrees or more. The angle may be less than 180 degrees, less than 170 degrees, less than 160 degrees, less than 150 degrees, less than 140 degrees, less than 130 degrees, less than 120 degrees, less than 110 degrees, less than 100 degrees.

The positive angle a (greater than 1 degree) of the first panel section 104 relative to the second panel section 106 may provide numerous advantages and benefits such as, for example, allowing the seal 110 to more positively engage the wall 18 (compared to if the angle a was zero or negative. The angle a also allows for fluid and/or debris to be directed in a rearward direction of the tonneau cover 22 (towards the tailgate) as opposed to remaining in place or traveling towards the front wall 18 if the angle was zero or negative. The angle also provides an improved aesthetic look, that a customer would desire.

The first panel section 104 and the second panel section 106 may be part of a single, unitary structure. In other words, the panel 24a may be formed with the geometry of the first panel section 104 arranged at an incline to the second panel section 106. The first panel 24a may be a plastic, aluminum, and/or composite molding, stamping, or extrusion that includes the profile of the first panel section 104 at an incline relative to the second panel section 106. In some configurations, the two panel sections 104, 106 may be separate discrete pieces, which are subsequently joined together via one or more fasteners, hinges, or transitions. In such a configuration, the panel sections 104, 106 may be joined together such that the sections 104, 106 are restricted or prevented from moving, bending, or pivoting relative to each other.

A transition region 105 may be located or defined between the first panel section 104 and the second panel section 106. The transition region 105 may be a rigid transition that does not allow relative movement of the first panel section 104 relative to the second panel section 106. In other words, the transition region 105 may be free of any hinge or structure that allows the first panel section 104 to bend, flex, move, pivot relative to the second panel section 106.

In some configurations, the two panel sections 104, 106 may be separate discrete pieces, which are subsequently joined together via one or more hinges, which thus allows the second panel section 106 to bend, pivot, or move relative to the first panel section 104, or vice versa. In some configurations, a living hinge may be located at the transition region 105 that allows some movement (i.e., bending, flexing, moving, pivoting) of one or both of the two panel sections 104, 106 relative to each other or the vehicle 10.

Each of the panel sections 104, 106 may be generally hollow members. That is, each of the panel sections 104, 106 may be made of a generally hollow core with a skin or other cover material formed or installed over the core. This will allow the panel sections 104, 106 to be generally lightweight but rigid. The other panels 24b-e may also be constructed of a similar hollow structure with the skin or covering layer over the hollow core. Of course, one or both of the panel sections may be made of a solid or corrugated construction.

The first panel section 104 includes a seal channel 108. The seal channel 108 may extend partially or entirely along a length of the first panel section 104 in a cross-car direction. The seal channel 108 may be located at a forward or front edge or end of the first panel section 104. The seal channel 108 may be configured to engage a seal 110.

The seal 110 may include an engaging member 112 that is configured to engage the seal channel 108. The seal 110 may be flexible, extruded member. The seal 110 may be a bulb seal. The seal 110 may comprise a first seal section 114, a second seal section 116, and a third seal section 118. The first and/or third seal sections 114, 118 may be a lip, whisker, or finger. The second seal section 116 may be a bulb. The seal 110 may include any number of lips, whiskers, or finger parts. For example, the seal 110 may include only one lip (i.e., only seal section 116 or 118). Alternatively, the seal 110 may include additional lips (more than the two shown). The seal 110 may also include more than one bulb. In some configurations, the seal 110 may have no bulbs.

The seal 110 may be arranged to face a forward direction in vehicle position. That is, the engaging member 112 may engage the first panel 24 or first panel section 104 in a way that allows the seal 110 to face forward or to be vertically-mounted. This vertically-mounted seal is in contrast to a horizontally-mounted seal, as would be the case with the seal that engages the supporting surface 46 on the bed rail 28a illustrated in FIG. 5. As would be appreciated by one having skill in the art, a bulb seal that is like the seal 110 may engage the supporting surface 46 on the bed rail 28a illustrated in FIG. 5. Such a seal may or may not include the seal fingers 114, 118 that seal 110 includes.

The first panel 24a may comprise a side cap 120 that is secured to the first panel section 104 via a fastener 121. The side cap 120 may function to close out the gap or hollowness of the first panel section 104.

The tonneau cover 22 includes a molding 122. As was described above with reference to FIGS. 1 and 2, the molding 122 may extend along a length of the tonneau cover 22 to cover or close out a gap or spacing between the panels 24 and the bed walls 16a, 16b or bed caps of the vehicle. The molding 122 may be flexible at least in the regions of the hinges 26, to permit the panels 24 to move, bend, and/or fold.

Figure 20:
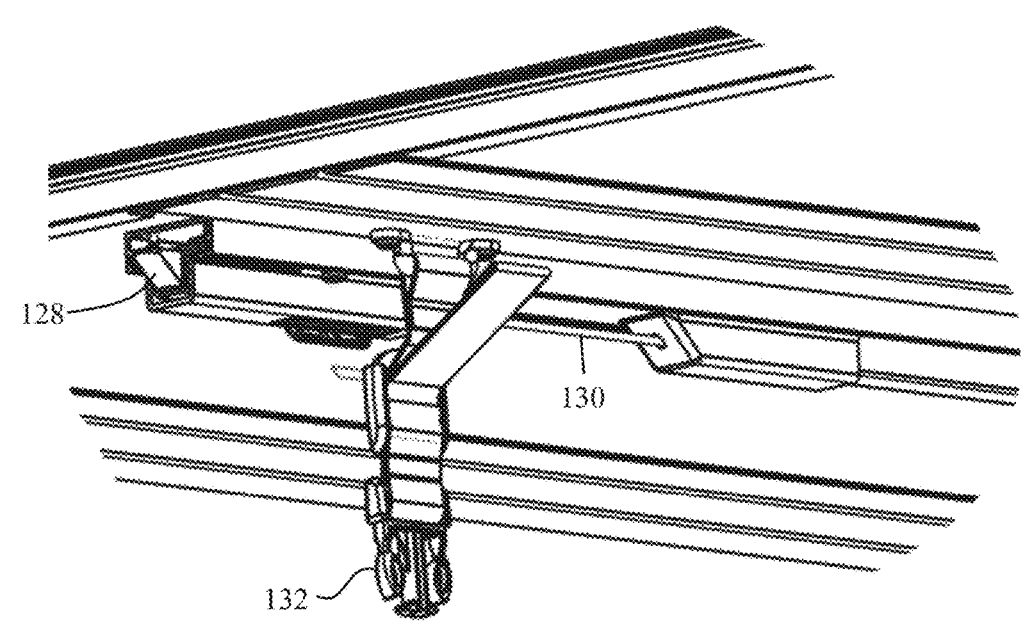
FIG. 20 is another perspective view of a latch and securing strap.

The first panel 24a comprises a catch 124 for receiving a securing strap of the tonneau cover 22 when the tonneau cover 22 is in an open position, to restrict or prevent the panels 24 from unfolding or moving, especially when the vehicle 10 is driven with the tonneau cover 22 in an open configuration. An exemplary securing strap is illustrated at FIG. 20.

Figure 15A:
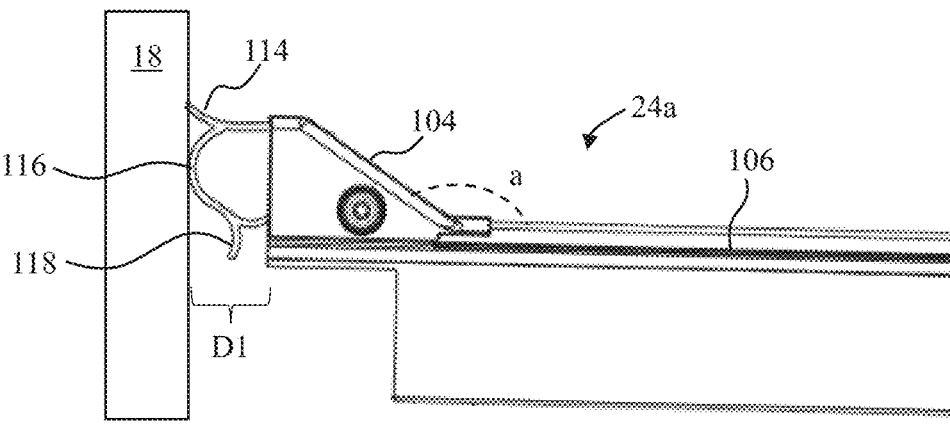
FIG. 15A is a side view of the first panel relative to the front wall of the cargo area.
Figure 15B:
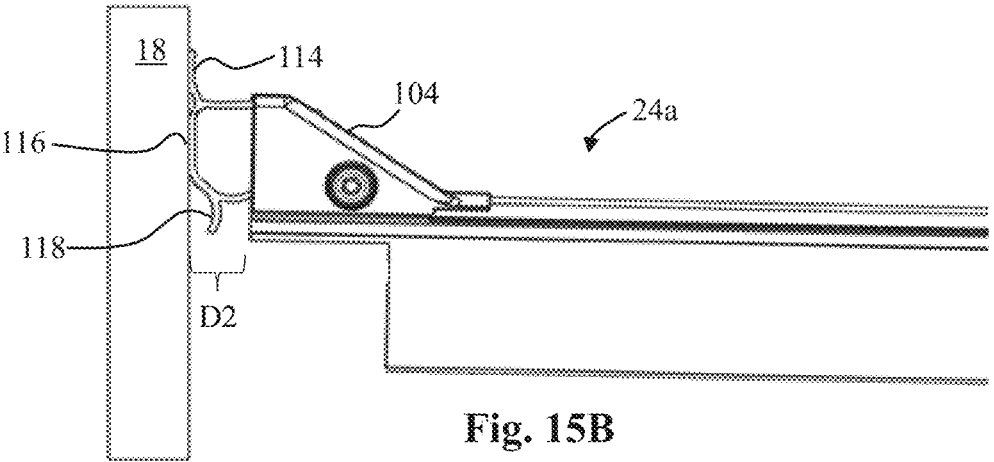
FIG. 15B is a side view of the first panel relative to the front wall of the cargo area.
Figure 15C:
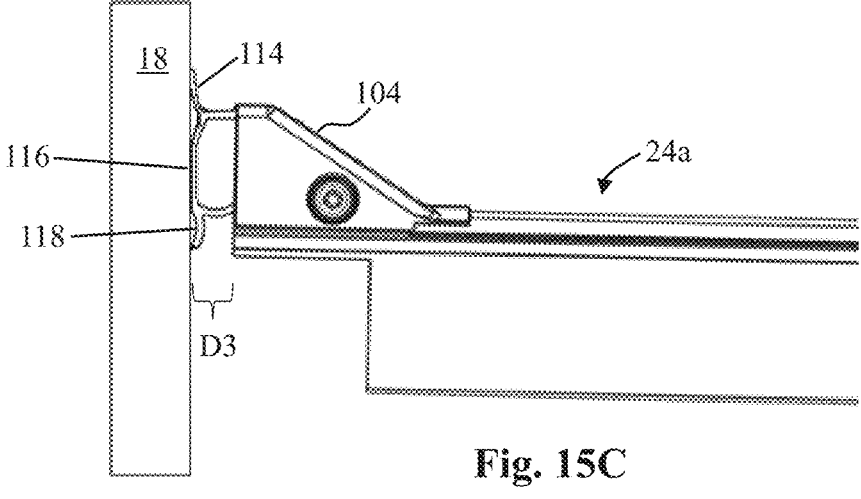
FIG. 15C is a side view of the first panel relative to the front wall of the cargo area.

FIGS. 15A, 15B, 15C illustrate the first panel 24a relative to the front wall 18 of the vehicle or cargo area (See FIGS. 1-3).

The tonneau cover 22 according to these teachings can accommodate different cargo areas of various lengths. The bed length may be the length defined between the front wall 18 and the rear wall or tailgate 20. For example, referring to FIG. 15A, when a spacing between the front wall 18 and the first panel section 104 is large (D1), the first seal section 114 may contact or engage the front wall 18. The contact between the first seal section 114 and the front wall 18 may restrict or prevent fluid and/or debris from entering between the front wall 18 and the first panel section 104 and potentially into the cargo area of the vehicle. The second and third seal sections 116, 118 may be free from contacting the front wall 18. However, the contact between the first seal section 114 and the front wall 18 is sufficient to prevent water and/or debris from passing between first panel section 104 and the front wall 18.

Referring to FIG. 15B, when a spacing between the front wall 18 and the first panel section 104 is slightly smaller (D2) than the spacing in FIG. 15A (D1), then both of the first seal section 114 and the second seal section 116 may contact or engage the front wall 18. The contact between the first and second seal sections 114, 116 and the front wall 18 may restrict or prevent fluid and/or debris from entering between the front wall 118 and the first panel section 104 and potentially into the cargo area of the vehicle. The third seal section 118 may be free from contacting the front wall 18. However, the contact between the first and second seal sections 114, 116 and the front wall 18 is sufficient to prevent water and/or debris from passing between first panel section 104 and the front wall 18.

Referring to FIG. 15C, when a spacing between the front wall 18 and the first panel section 104 is even smaller (D3) than the spacing in FIG. 15A (D1) and FIG. 15B (D2), then all the seal section 114, 116, 118 may contact or engage the front wall 18. The contact between the seal sections 114, 116, 118 and the front wall 18 may restrict or prevent fluid and/or debris from entering between the front wall 118 and the first panel section 104 and potentially into the cargo area of the vehicle.

Furthermore, with the first panel section 104 being arranged at an incline relative to the second panel section 106, any fluid and/or debris on the first panel section 104 will roll or fall towards the second panel section 106 and thus reduce chance of falling between the first panel section 104 and the wall 18. Moreover, any fluid and/or debris located on the second panel section 106 will have difficulties traversing the incline wall of the first panel section 104.

Figure 16:
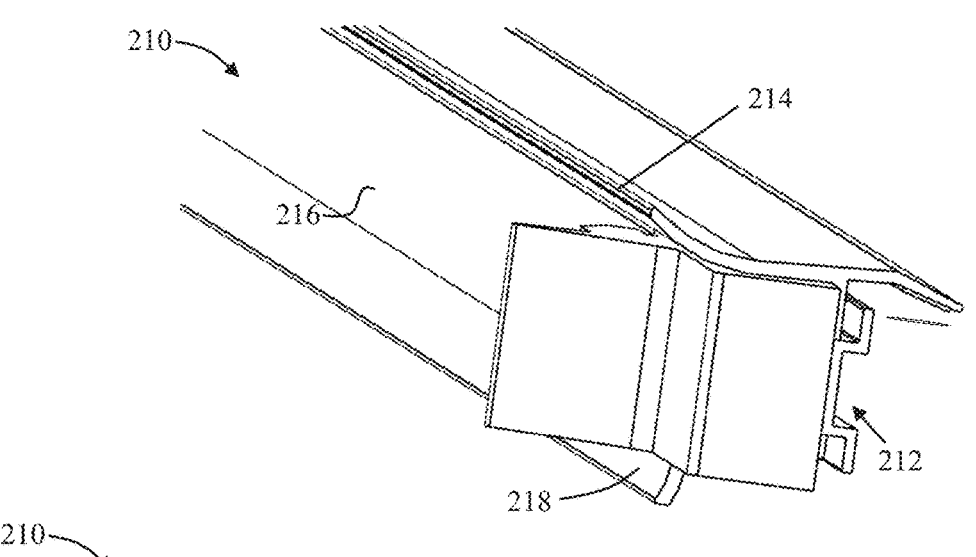
FIG. 16 is a partial perspective view of a seal.
Figure 17:
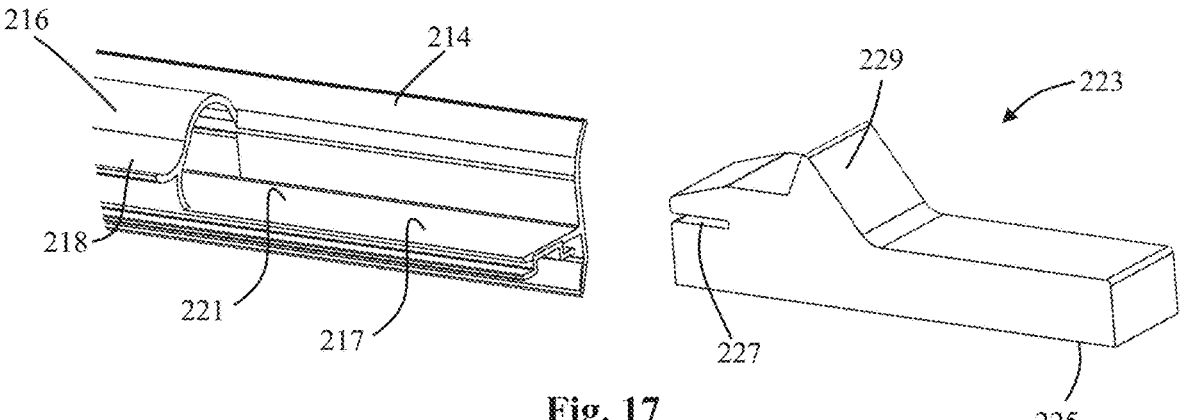
FIG. 17 is an exploded, partial perspective view of the seal of FIGS. 16 and 18.
Figure 18:
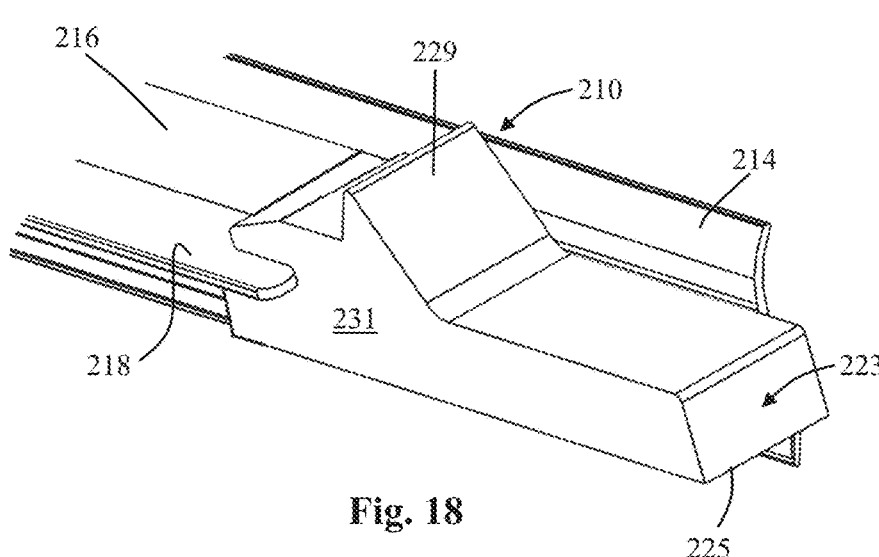
FIG. 18 is a partial perspective view of a seal.

FIGS. 16, 17, and 18 illustrate a seal 210. The seal 210 may be substantially similar in construction and function as the seal 110 discussed above and therefore remarks relating to seal 110 may refer to seal 210 and vice versa unless otherwise noted. Seal 210 may include an engaging member 212 that is configured to engage the seal channel 108 of the first panel section 104 (See FIG. 14). The seal 210 may be flexible, extruded member. The seal 210 may be a bulb seal. The seal 210 may include a similar construction to seal 110 and may comprise a first seal section 214, a second seal section 216, and a third seal section 218. The first and/or third seal sections 214, 218 may be a lip, whisker, or finger. The second seal section 216 may be a bulb. The seal 210 may include any number of lips, whiskers, or finger parts. For example, the seal 210 may include only one lip (i.e., only seal section 216 or 218). Alternatively, the seal 210 may include additional lips (more than the two shown). The seal 210 may also include more than one bulb. In some configurations, the seal 210 may have no bulbs.

With specific reference to FIG. 17, a portion 217 of the second seal section 216 may be omitted. This portion 217 may be omitted during the molding or extrusion process. This portion 217 may be removed or cut out in a post forming process (e.g., post-molding or extrusion). In this cutout section 217 of the seal 210, the first seal section 214, the third seal section 218, and the base 221 may remain or left intact. However, in some configurations, one or more of these sections 214, 218, 221 may also be partially or completely omitted or cutout as well.

A seal block 223 may be added to the seal 210. The seal block 223 may have a base part 225 that is attached or supported on the base 221 of the seal 210. An adhesive such as a glue, pressure-sensitive adhesive, two-way tape, etc., may be provided between the bases to ensure a sufficient connection or attachment of the seal block 223 to the seal 210.

The seal block 223 may include a cutout or recess 227 for receiving at least a portion of the second seal section 216 or bulb therein. The seal block 223 may include a sealing projection 229. After assembly of the seal block 223 to the seal 210, the sealing projection 229 extends above or beyond the bulb or second seal section 216. After assembly of the seal block 223 to the seal 210, the third seal section 218 extends or protrudes beyond a base 231 of the seal block 223 (FIG. 18). After the seal 210 is installed on the first panel section 104 (FIG. 13), the sealing projection 229 may contact the front wall 18 (FIGS. 15A-15C) to provide additional sealing against the front wall 18. Advantageously, this may restrict or prevent water and/or debris from passing between the seal 210 and the front wall 18. Furthermore, the seal 110, 210 may engage the front wall 18 to reduce or eliminate vibrations and/or BSR issues (Buzz, squeak and rattle issues).

While the embodiment illustrated in FIGS. 16-18 shows the cut out region 217 as being located at one of the ends of the seal 210, it is understood that the cut out region 217 may also or instead be located at an opposing end of the seal 210. It is further understood that the length of the cut out region 217 and the length of the corresponding seal block 223 may be any length. Furthermore, the cut-out region 217 may also exist somewhere in between the ends of the seal 210. In this regard, cut out region 217 may be located in a middle region of this seal 210 in addition or instead of the end region illustrated in FIGS. 16-18.

The seal block 223 may be made from the same material as one or more parts of the seal 210. Alternatively, the seal block 223 may be made from a different material as one of more parts of the seal 210. For example, the seal block 223 may be made of a foam or rubber material. The seal 210 may be made of a foam or rubber material.

Figure 19:
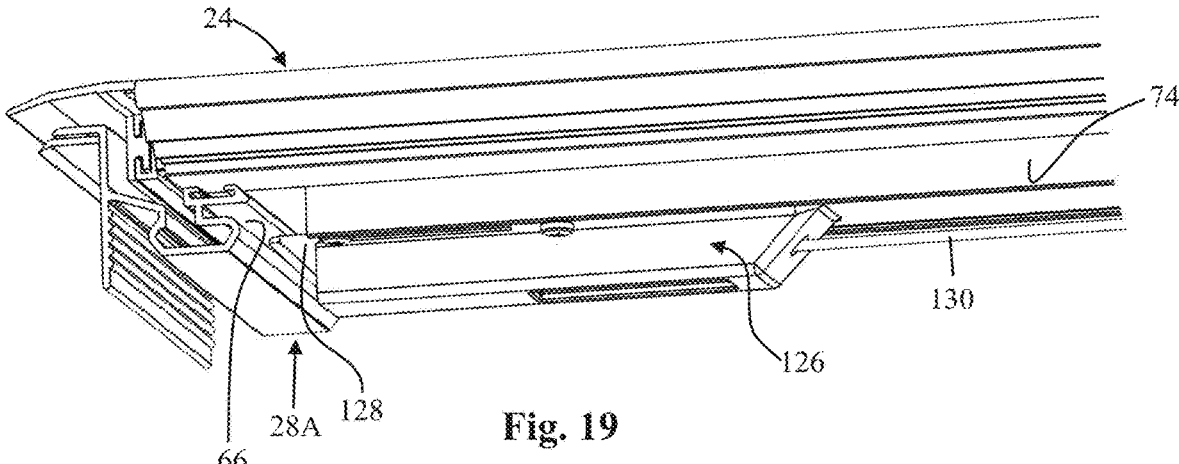
FIG. 19 is a perspective view of a latch engaging the bed rail.

Referring to FIG. 19, the tonneau cover 22 comprises one or more holding latches 126. Like the latches 80, the one or more holding latches 126 are attached to the bottom or B-side 74 of one or more of any of the panels 24 (24a-24e) of the tonneau cover 22.

The holding latch 126 may have an engaging finger 128 that is configured to project into the groove or channel 66. The groove or channel 66 may be defined between the drain channel and the supporting surface, which may also function to receive the latch catch, all of which are described above. By engaging the channel 66, the holding latch 126 may function to restrict or prevent movement or opening of the one or more panels 24. To release the holding latch 126, a user or operator may pull on the release chord 130 to retract the engaging finger 128 from the channel 66 to allow the panel 24 to be moved.

FIG. 20 illustrates a securing strap 132. The securing strap 132 may be attached to the B-side of a panel 24, to a frame, to a latch, or a combination thereof. When the tonneau cover is in an open position, the B-side of the panel having the securing strap 132 may be exposed or facing upwards. The securing strap 132 may then engage the catch 124 illustrated at FIGS. 13 and 14 to restrict or prevent the folded tonneau cover from moving or unfolding.

Figure 21:
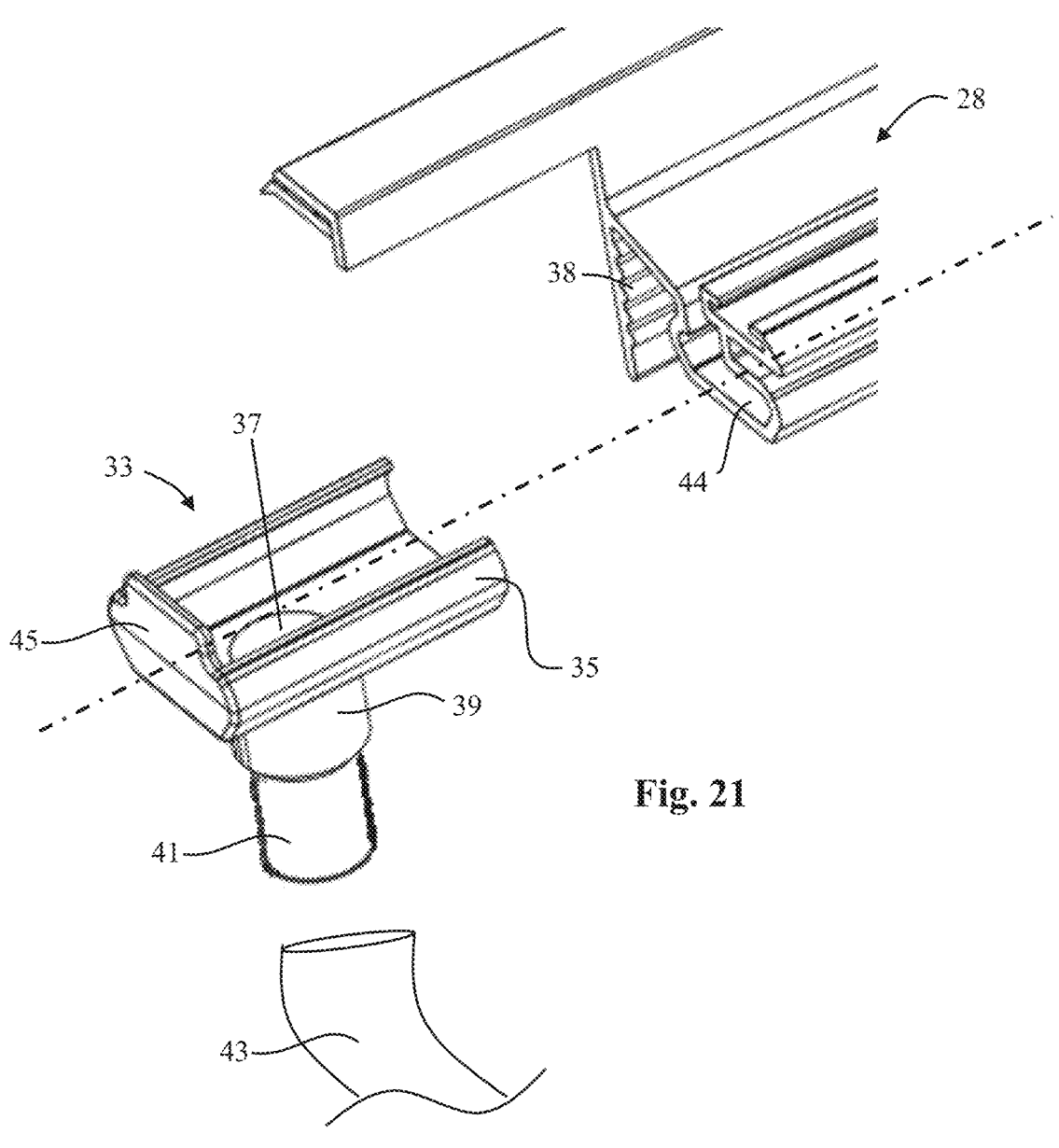
FIG. 21 is an exploded perspective view of a fluid and/or debris drain and an end portion of the bed rail.

FIG. 21 illustrates a fluid and/or debris drain 33 and an end portion of the bed rail 28. The fluid and/or debris drain 33 has a base 35 that is configured to engage the drain channel 44 of the bed rail 28. The base 35 may have a size that is larger than the drain channel 44 so that the base at least partially surrounds the exterior walls of the drain channel 44. In some configurations, the base may have a size that is slightly smaller than the drain channel 44 so that the walls of the base 35 may fit into or within the walls defining the drain channel 44.

The base 35 may include one or more openings 37. The one or more openings 37 may be configured to evacuate fluid and or debris collected within the drain channel 44 to an exterior location of the drain channel 44, the bedrail 28, and or the vehicle. The fluid and/or debris drain 33 May include one or more tubes. The one or more tubes may be in communication with the opening 37. The one or more tubes may include a first portion 39 having a first diameter and a second portion 41 arranged below the first portion 39 and having a second diameter that is slightly smaller than the first diameter of the first portion 39. A hose 43 may be connected to the tubes of the fluid and/or debris drain 33. More specifically, depending on an inner diameter of the hose 43, the hose 43 might engage either the first portion 39 or the second portion 41. Stated in another way if the diameter of the hose 43 is smaller, than the hose may engage the second portion 41. However if the diameter of the hose 43 is larger, than the hose 43 may engage the first portion 39 which has a larger diameter. By having a fluid and/or debris drain 33 with two or more tube sections having different diameters, a hose 43 of varying sizes or inner diameter may be used. That is, a single fluid and/or debris drain 33 may be used for various applications, and a larger hose 43 may be used in applications that require more fluid and or debris to be evacuated, while a smaller hose 43 may be used in applications where less fluid and or debris need to be evacuated from the drain channel 44.

The fluid and/or debris drain 33 and/or the base 35 may include an end wall 45. The end wall 45 may function to block fluid and or debris from being evacuated from within the base 35 and or the drain channel 44 and instead direct the fluid and or debris to be evacuated through the opening 37. However, in some configurations, the end wall 45 may include one or more openings for evacuating the fluid and/or debris similar to the opening 51 in the end wall 49 of the rail cap illustrated and discussed above at FIG. 5.

These teachings provide a cover. The cover may be an apparatus or assembly for at least partially covering or concealing at least a portion of a vehicle, such as a cargo area. The cover may be a tonneau cover, topper, cap, tent, the like, or a combination thereof.

The cover may be attached, placed, supported, connected, and/or made to rest on one or more top surfaces and/or side surfaces (inside and/or outside) of one or more walls defining a cargo area. The cover may be attached, placed, supported, connected, or made to rest on one or more rails or supports that are attached or connected to one or more surfaces (inside, outside, and/or top) of one or more walls defining the cargo area. The cover or one or more components thereof may be an aftermarket product that is/are attached to a vehicle by a vehicle owner. The cover or one or more components thereof (e.g., the one or more panels, bed rails, moldings, hinges, etc.) may be assembled, installed, and/or integrated into the vehicle or cargo area by an OEM (Original Equipment Manufacturer) or an OEM or aftermarket dealer.

One or more of the features or elements of the cover and/or bed rail disclosed and/or illustrated herein may be provided or combined with any cover, even though the combination or integration is not illustrated or expressly disclosed herein. Moreover, one element or feature of the cover and/or bed rail may be moved or repositioned into another area or feature of the cover and/or bed rail. One or more features or elements of the cover and/or bed rail disclosed and/or illustrated herein may be copied or duplicated. One or more features or elements of any of the cover and/or bed rail disclosed and/or illustrated herein may be removed or eliminated.

The vehicle may be any vehicle. The vehicle may have a cargo area or bed. The cargo area or bed may be any area or portion of a vehicle that may be used for storing and/or transporting goods or cargo. The cargo area may be a cargo box, bed, trunk, storage compartment, or a combination thereof. The cargo area may be located in a front portion of a vehicle, a middle portion of a vehicle, and/or a rear portion of a vehicle. The cargo area may be located behind or adjacent a passenger area of a vehicle, where one or more passengers, occupants, and/or drivers may sit. A cargo area may be a trailer that is configured to be pulled, towed, or pushed by another vehicle. The cargo area may have an open top. The cargo area or open top can be at least partially closed or covered by a cover. The cargo area may be part of a pickup truck. The cargo area may be part of a utility task vehicle or utility terrain vehicle (UTV). In some configurations, the cargo area may have another cover or top on it, and the cover according to these teachings may be provided between the floor of the cargo area and the cover or top. For example, the cover according to these teachings may be provided inside a vehicle or sport utility vehicle (SUV) to close or cover or conceal contends in the hatch, trunk, or other region of the vehicle.

The cover may be an assembly comprising one or more panels. A panel as used herein may be any of the one or more parts, portions, components, or sections of the cover that are moveable or can be moved relative to another part, portion, component or section of the cover, a vehicle, a cargo area, or a combination thereof. The one or more panels may be a rigid section of the cover, a flexible section of the cover, a frame, a frame member, a spacer, a hinge, or a combination thereof.

The one or more panels may be separate or discrete pieces that are joined together with one or more hinges.

In some configurations, two or more panels may be defined in or within a single panel. For example, a single panel may be provided that includes one or more living hinges that divide the single panel into two or more panels. A living hinge may be a cutout, detent, notch, groove, channel, thinned-area, flexible material, or a combination thereof formed or added to a panel. Two or more of such panels with one or more living hinges may be combined to define the cover. A living hinge may be one of the hinges used in this application.

The one or more panels may be made of a suitable material, such as plastic, metal, foam, composite, wood, fiberglass, or a combination thereof. The one or more panels may be substantially rigid, soft, or flexible, bendable, resilient, or a combination thereof. The one or more panels may comprise a core that is covered in a skin. The core may be a plastic material such as extruded polypropylene or foam. The skin may be a sheet or spray that covers the core. The skin may be TPU, TPV, TPE, and/or TPR. The one or more panels may be made of the same or similar material as the cargo area or fenders so that the cover and the cargo area and vehicle have a uniform appearance. The one or more panels may be made of a single material or may be formed of multiple materials or components that are assembled together. The one or more panels may include one or more frames or frame members that provide strength and rigidity to the panels. The one or more hinges may be part of the panel or separate members. The one or more frames or frame members may be covered by a skin or over molded with a material to form the one or more panels. The hinge may be over molded or covered by a skin so that the cover has a uniform and sleek appearance, to cover or protect the hinge and/or torsion elements from wear and tear and/or bumping with objects inside the cargo area.

The one or more of the panels can be moved or repositioned relative to one another and/or relative to the cargo area or vehicle to move the cover or one or more panels thereof between a closed configuration and an open configuration and vice versa.

A closed configuration means that the one or more panels are arranged to at least partially conceal, block, hide, restrict, or otherwise prevent sight, access, and/or entry to an inside of the cargo box. In the closed configuration, the one or more panels may be arranged to protect against dirt, debris, fluid, sunlight, and/or other contaminants or items from entering an inside of a cargo area. In the closed configuration, one or more of the panels may be in a generally horizontal position, and free from being stacked or folded on top of another panel. The closed configuration may refer to one or more panels being in a closed configuration or to the entire cover assembly being in the closed configuration. In other words, one of the panels may be in the closed configuration (for example, a panel that is located near or adjacent to the passenger area, while another panel (for example one that is located rearward of the closed panel, closer to the tailgate) is in the open configuration. A closed configuration may be when the one or more panels restrict more access into the cargo area than when the cover or panel is in an open configuration. In other words, a closed configuration may still provide access into the cargo area, but the access or opening is smaller or less than when the cover or panel is in an open configuration. In the closed or partially closed configuration, one or more of the panels may be in any non-horizontal position. A partially closed configuration may be when the panel is more closed than a panel when the panel is in a partially open configuration. In some instances, a partially open configuration and a partially closed configuration may be use synonymously.

An open configuration means that the one or more panels are arranged to at least partially provide access or entry to or into the cargo area or an inside thereof. In the open configuration, one or more of the panels may be moved or repositioned from the closed configuration to provide sight and/or access to an inside of the cargo box. In the open configuration, one or more of the panels may be in any non-horizontal position. In the open configuration, one or more of the panels may be in a generally horizontal position but may be stacked or folded on top of one or more other panels. The open configuration may refer to one or more panels being in an open configuration or to the entire cover assembly being in the open configuration. In other words, one of the panels may be in the closed configuration (for example, a panel that is located near or adjacent to the passenger area, while another panel (for example one that tis located rearward of the closed panel, closer to the tailgate) is in the open configuration.

The one or more panels may be moved from a closed configuration to an open configuration and vice versa by moving, repositioning, or otherwise changing a position of one or more panels relative to one or more other panels, the cargo box, the vehicle, one or more hinges, or a combination thereof. For example, a position of one or more of the panels can be changed by moving, pivoting, folding, swinging, or otherwise turning or flipping one or more panels over or onto another one or more panels about one or more hinges, frames, panels, torsion elements, or a combination thereof. The one or more panels can be manually moved between the closed and open configurations. The one or more panels can be automatically moved between the closed and open configurations via one or more motors, cylinders, actuators, or a combination thereof.

The cover may include one or more hinges. A panel may include one or more hinges. A hinge may be a joint, turning point, juncture, axis, journal, or other feature about which one or more panels or spacers can be move, pivot, swing, bend, fold, roll, flex, displace, or otherwise change position relative to one or more other panels, the cargo box, the vehicle, or a combination thereof. A hinge may allow or provide for the one or more panels to be moved between the open and closed configuration, or into a position in between the open and closed configuration.

A hinge may be provided between two panels. A hinge may define or separate two adjacent panels. A hinge may also be attached to both a fixed or nonmoving portion of the vehicle or cargo bed and to a panel of the cover. One or more torsion elements may be provided at the one or more hinges, to assist with moving the cover between the open and closed configurations. A torsion element may be a torsion bar, a spring, a torsion spring, or the like.

One or more bed rails may be attached to the cargo area of the vehicle. The one or more bed rails may be attached to one or more of the: side wall (driver and/or passenger), front wall, and/or rear wall or tailgate. The one or more bed rails may be attached to a top surface of a bed wall, an inside surface of a bed wall, an outside surface of a bed wall, or a combination thereof. The one or more bed rails may be attached via one or more clamps or fasteners. The one or more bed rails may be removable attached to the one or more walls. The one or more bed rails may be permanently attached to the one or more walls. Removably attached means the one or more bed rails can be removed from the one or more bed walls without destroying or affecting the performance of the one or more bed rails and/or walls. Permanently attached means the one or more bed rails cannot be removed from the one or more bed walls without destroying or affecting the performance of the one or more bed rails and/or walls. The one or more bed rails may be integrally formed with the one or more walls.

The one or more bed rails may have a drain channel. The drain channel may extend at least partially along an entire length of the bed rail. The drain channel may capture, collect, and retain fluid and/or debris and then evacuate the same at one or more areas along a length of the drain channel. For example, one or more drains may be connected to the drain channel for evacuating the fluid and/or debris. Additionally, or alternatively, the fluid and/or debris may be evacuated from the drain channel via one or more tubes, drains and/or open ends, at a forward and/or rearward end of the bed rail and/or anywhere along a length of the bed rail.

The bed rail may have one or more end caps that close off the forward or rearward end of the drain channel. The bed rail end cap may close off the open end to give the bed rail a closed, finished look. The bed rail end cap may function to close off any sharp edges that may form at the end of the bed rail during the extrusion and/or cutting process. A bed rail end cap may have a projection or belly that fits into the drain channel. A bed rail end cap may be secured to the bed rail via one or more fasteners.

A bed rail may be formed from a suitable material, such as aluminum, metal, or a composite plastic material. A bed rail may be formed by a suitable manufacturing method such as extrusion or injection molding. A bed rail may be formed from a single unitary member. A bed rail may be an assembly of two or more members.

The bed rail may have one or more latch catches. A latch catch may function to restrict or prevent movement of the one or more panels of the tonneau cover, when the tonneau cover or the one or more panels are in a closed or horizontal position. The latch catch may be part of the bed rail. The latch catch may be an additional component that is attached to the bed rail, the side wall of the cargo area, or both. The latch catch may be a mechanical stop that prevents forward and/or reward ward movement or sliding of one or more panels. A bed rail may have only one latch catch. A bed rail may have more than one latch catch. The one or more latch catches may be located at a front, middle, and/or end of the bed rail. There may be one or more than one (i.e., two or more) latch catches on each side of a single panel.

A latch catch may comprise a base part. The base part may be part of the bed rail, the side wall, or both or may be a discrete member. The latch catch may comprise one or more members or fingers that extend from the base part. The one or more members may extend towards the center of the cargo area, towards the floor of the cargo area, or both. The one or more fingers may engage the latch. That is, the latch may be captured between two adjacent fingers. The latch catch may be made from a suitable material such as plastic, metal, a composite, or a combination thereof. A latch catch may be molded or stamped. A latch catch may be integrated with a bed rail a bed cap or both.

The seal disclosed herein maybe made from a suitable material such as a rubber, a plastic, a compressible material a bias table material, an elastic material a material having elastic properties, or a combination thereof. The seal may be an extruded member. This seal may be made of and EPDM material. This seal may be made of a single durometer material, a dual durometer material, or even having three different durometers. The seal block disclosed here and may be made of the same material as the seal or a different material. The seal block may be made of a foam or rubber material. The seal block may be attached to the seal before installation to the tonneau cover. The seal block may be attached to the seal after installation to the tonneau cover.

A latch assembly may be fixed or mounted to one or more panels. A latch assembly may be fixed or mounted to a B-side of one or more panels, to a lateral edge or one or more panels, or both. A latch assembly may comprise a moveable latch or member or finger that is configured to extend into the space or gap defined between the fingers or members of the latch catch. The latch may be engaged by manually or automatically sliding the latch in a track and moving the latch into engagement between the fingers or member of the latch catch. The latch may be moved by manipulating an unlatching tab, which may allow the latch to slide in a track towards the latch catch. The latch may need to be disengaged from the latch catch to allow the corresponding panel to be moved into an open position (i.e., moved from a horizontal position into a non-horizontal position and/or into another horizontal position). The latch assembly may include one or more springs or bias members that function to maintain the latch in an engaged or disengaged position.

The term fastener is used herein to secure one or more elements to one or more other elements and/or to the vehicle. Any fastener or fastening method herein may be a suitable fastener for automotive and/or tonneau cover applications. For example, a fastener may be a screw, nut, locking nut, locking screw, self-tapping screw, glue, adhesive, weld, tape, double-sided tape, hook and loop fastener, rivet.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below," or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

One or more of the features or elements disclosed herein may be omitted from the illustrated design. One or more of the features or elements disclosed herein may be duplicated, rearranged, moved to another location, moved into a different axial, angular, and/or rotational position. One or more of the features or elements disclosed herein may be isolated from another feature, element, and/or assembly and form the basis for a claimed invention. One or more of the features or elements disclosed herein may be combined with another feature, element, and/or assembly and form the basis for a claimed invention.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A tonneau cover for at least partially covering a cargo area of a vehicle, the cargo area having a pair of opposing side walls, a front wall, and a tailgate, the tonneau cover comprising:

a first panel configured to be arranged adjacent to the front wall;

a second panel adjacent to the first panel and rearward of the first panel, the second panel configured to be folded relative to the first panel to move the tonneau cover between an open configuration and a closed configuration, wherein the first panel comprises a first panel section and a second panel section, wherein the first panel section is arranged at an incline relative to the second panel section;

wherein the first panel section includes a first uppermost panel surface and a first lowermost panel surface, and the first uppermost panel surface is spaced apart from the first lowermost panel surface along a vertical direction;

wherein the second panel section includes a second uppermost panel surface and a second lowermost panel surface, and the second uppermost panel surface is spaced apart from the second lowermost panel surface along the vertical direction;

wherein the first uppermost panel surface of the first panel section has an uppermost portion;

wherein the first uppermost panel surface of the first panel section has a lowermost portion;

wherein the first panel section has a first maximum height at the uppermost portion of the first uppermost panel surface;

wherein the first panel section has a second maximum height at the lowermost portion of the first uppermost panel surface;

wherein each of the first maximum height and the second maximum height are defined from the second uppermost panel surface of the second panel section to the first uppermost panel surface of the first panel section along the vertical direction;

wherein the first maximum height of the first panel section is greater than the second maximum height of the first panel section; and wherein the lowermost portion of the first uppermost panel surface is closer to the second panel section than the uppermost portion of the first uppermost panel surface.

2. The tonneau cover according to claim 1, wherein the uppermost portion of the first uppermost panel surface is closer to the front wall than the lowermost portion of the first uppermost panel surface when the tonneau cover is installed in the vehicle.

3. The tonneau cover according to claim 2, wherein the incline comprises an angle is between about 110 degrees and 145 degrees.

4. The tonneau cover according to claim 3, wherein the first panel section and the second panel section are formed as a single, integral structure.

5. The tonneau cover according to claim 4, wherein the first panel section comprises a forward end comprising a seal that is configured to abut the front wall.

6. The tonneau cover according to claim 5, wherein the seal comprises a first seal section, a second seal section, and a third seal section, wherein one or more of the first seal section, the second seal section, and the third seal section contact the front wall, depending on a distance defined between the first panel section and the front wall.

7. A tonneau cover for at least partially covering a cargo area of a vehicle, the cargo area having a pair of opposing side walls, a front wall, and a tailgate, the tonneau cover comprising:

a first panel configured to be arranged adjacent to the front wall;

a second panel adjacent to the first panel and rearward of the first panel, the second panel configured to be folded relative to the first panel to move the tonneau cover between an open configuration and a closed configuration, wherein the first panel comprises a first panel section and a second panel section, wherein the first panel section is arranged at an incline relative to the second panel section;

wherein the first panel section comprises a forward end comprising a seal that is configured to abut the front wall; and wherein the seal comprises a seal block attached to the seal, the seal block being made from a different material than the seal.

8. The tonneau cover according to claim 7, wherein the seal includes a cut out portion and the seal block is attached to the seal in the cut out portion.

9. The tonneau cover according to claim 1, wherein the tonneau cover comprises a bed rail attached to one or both of the side walls, the bed rail comprises a latch catch and the tonneau cover comprises a latch assembly that engages the latch catch to restrict or prevent fore-aft movement of the tonneau cover.

10. The tonneau cover according to claim 9, wherein the latch catch comprises a base part and one or more members extending from the base part.

11. The tonneau cover according to claim 10, wherein the bed rail comprises a groove and the base part is received into the groove.

12. A tonneau cover for at least partially covering a cargo area of a vehicle, the cargo area having a pair of opposing side walls, a front wall, and a tailgate, the tonneau cover comprising:

a first panel configured to be arranged adjacent to the front wall;

a second panel adjacent to the first panel and rearward of the first panel, the second panel configured to be folded relative to the first panel to move the tonneau cover between an open configuration and a closed configuration;

wherein the first panel comprises a first panel section and a second panel section, wherein the first panel section is arranged at an incline relative to the second panel section;

wherein the tonneau cover comprises a bed rail attached to one or both of the side walls, the bed rail comprises a latch catch and the tonneau cover comprises a latch assembly that engages the latch catch to restrict or prevent fore-aft movement of the tonneau cover;

wherein the latch catch comprises a base part; and wherein the latch catch comprises two members extending from the base part, each of the two members extend in an inwardly and downwardly direction in vehicle position.

13. The tonneau cover according to claim 9, wherein the latch assembly comprises a latch and a track, the track is secured to a B-side of the first panel or the second panel, and wherein the latch assembly comprises an unlatching tab to move the latch within the track to engage and disengage the latch catch, wherein the track extends in a cross car direction in vehicle position.

14. The tonneau cover according to claim 1, comprising a drain for evacuating fluid and/or debris from a drain channel of a bed rail upon which the tonneau cover is configured to be supported on, wherein the drain comprises a first section configuration to engage a tube having a first diameter and a second section that is configured to engage a tube having a second diameter that is larger than the first diameter.

15. The tonneau cover according to claim 14, comprising an end cap for attaching to an end of the bed rail, the end cap comprising a closed end wall.

16. The tonneau cover according to claim 14, comprising an end cap for attaching to an end of the bed rail, the end cap comprising an end wall comprising an opening for evacuating fluid and/or debris from the drain channel.

17. The tonneau cover according to claim 11, wherein the tonneau cover comprises one or more holding latches, and the one or more holding latches are configured to engage the groove that the base part of the latch catch engages.

18. The tonneau cover according to claim 17, wherein the one or more holding latches are disengaged from the groove by pulling a cable.

19. The tonneau cover according to claim 8, wherein the front wall is mid-gate of a vehicle that is configured to be moved to provide a pass through between a passenger area of the vehicle and the cargo area of the vehicle.

20. The tonneau cover according to claim 1, wherein the first panel section includes a forwardmost surface, and the tonneau cover comprises a seal attached directly at the forwardmost surface of the first panel section.

* * * * *